United States Patent

Nishida et al.

(10) Patent No.: US 9,720,337 B2
(45) Date of Patent: Aug. 1, 2017

(54) ELECTROPHOTOGRAPHIC PHOTOSENSITIVE MEMBER, PROCESS CARTRIDGE AND ELECTROPHOTOGRAPHIC APPARATUS, AND CHLOROGALLIUM PHTHALOCYANINE CRYSTAL AND METHOD FOR PRODUCING THE SAME

(71) Applicant: CANON KABUSHIKI KAISHA, Tokyo (JP)

(72) Inventors: Tsutomu Nishida, Mishima (JP); Masato Tanaka, Tagata-gun (JP); Masataka Kawahara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/920,644

(22) Filed: Oct. 22, 2015

(65) Prior Publication Data

US 2016/0124326 A1    May 5, 2016

(30) Foreign Application Priority Data

Oct. 29, 2014 (JP) .................. 2014-220751

(51) Int. Cl.

| G03G 15/00 | (2006.01) |
|---|---|
| G03G 5/047 | (2006.01) |
| G03G 5/06 | (2006.01) |
| C09B 47/04 | (2006.01) |

(52) U.S. Cl.
CPC ........... *G03G 5/047* (2013.01); *C09B 47/045* (2013.01); *G03G 5/0696* (2013.01)

(58) Field of Classification Search
CPC ...................................... G03G 5/047

USPC .......................................... 399/111; 430/57.1
See application file for complete search history.

(56) References Cited

U.S. PATENT DOCUMENTS

2009/0068576 A1* 3/2009 Hongo ................ C09B 47/10
430/57.1

FOREIGN PATENT DOCUMENTS

| JP | 05-194523 A | 8/1993 |
|---|---|---|
| JP | 11-172143 A | 6/1999 |
| JP | 2000-344778 A | 12/2000 |
| JP | 2005-226013 A | 8/2005 |
| JP | 2005-249964 A | 9/2005 |
| JP | 2009-062475 A | 3/2009 |

* cited by examiner

*Primary Examiner* — Quana M Grainger
(74) *Attorney, Agent, or Firm* — Canon U.S.A., Inc. IP Division

(57) ABSTRACT

An electrophotographic photosensitive member includes a support and a photosensitive layer in this order. The photosensitive layer contains a chlorogallium phthalocyanine crystal. The chlorogallium phthalocyanine crystal has one or more peaks in each of a wavelength range of 646 nm or more and 668 nm or less and a wavelength range of 782 nm or more and 809 nm or less in an absorption spectrum. When a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

9 Claims, 4 Drawing Sheets

US 9,720,337 B2

ELECTROPHOTOGRAPHIC PHOTOSENSITIVE MEMBER, PROCESS CARTRIDGE AND ELECTROPHOTOGRAPHIC APPARATUS, AND CHLOROGALLIUM PHTHALOCYANINE CRYSTAL AND METHOD FOR PRODUCING THE SAME

BACKGROUND OF THE INVENTION

Field of the Invention

The present invention relates to an electrophotographic photosensitive member, a process cartridge and an electrophotographic apparatus that use the electrophotographic photosensitive member, and a chlorogallium phthalocyanine crystal and a method for producing the chlorogallium phthalocyanine crystal.

Description of the Related Art

Phthalocyanine pigments having an excellent function as a photoconductor are used as materials for electrophotographic photosensitive members, solar batteries, sensors, switching elements, and the like. Phthalocyanine pigments have various absorption spectra in accordance with their structures.

Japanese Patent Laid-Open No. 2005-249964 discloses a chlorogallium phthalocyanine crystal having a peak with a maximum absorbance in the wavelength range of 770 nm or more and 790 nm or less in the absorption spectrum with the wavelength range of 600 nm or more and 900 nm or less. Japanese Patent Laid-Open No. 2009-62475 discloses a chlorogallium phthalocyanine crystal having a peak with a maximum absorbance in the wavelength range of 760 nm or more and 773 nm or less in the absorption spectrum.

SUMMARY OF THE INVENTION

An electrophotographic photosensitive member according to one aspect of the present invention includes a support and a photosensitive layer in this order. The photosensitive layer contains a chlorogallium phthalocyanine crystal. The chlorogallium phthalocyanine crystal has one or more peaks in each of a wavelength range of 646 nm or more and 668 nm or less and a wavelength range of 782 nm or more and 809 nm or less in an absorption spectrum. When a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

Further features of the present invention will become apparent from the following description of exemplary embodiments with reference to the attached drawings.

DESCRIPTION OF THE EMBODIMENTS

Figure 1:
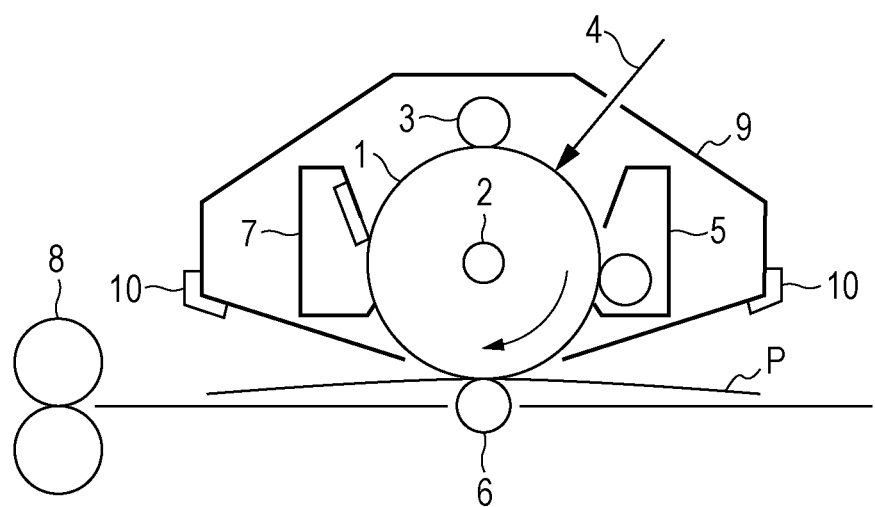
FIG. 1 illustrates an example of a schematic structure of an electrophotographic apparatus that includes a process cartridge including an electrophotographic photosensitive member.

Phthalocyanine pigments have an excellent function as a photoconductor, but higher sensitivity has been required with an increasing market demand in some uses. In particular, among such phthalocyanine pigments, chlorogallium phthalocyanine crystals are used, for example, as a charge generation material for electrophotographic photosensitive members. However, phthalocyanine pigments need to have higher sensitivity than before with the recent realization of high-speed electrophotographic apparatuses (high-speed processing).

Accordingly, the present invention is directed to providing a chlorogallium phthalocyanine crystal having high sensitivity and a method for producing the chlorogallium phthalocyanine crystal. The present invention is directed to providing an electrophotographic photosensitive member that uses the aforementioned chlorogallium phthalocyanine crystal, and a process cartridge and an electrophotographic apparatus that use the electrophotographic photosensitive member.

The chlorogallium phthalocyanine crystal according to an embodiment of the present invention has one or more peaks in each of a wavelength range of 646 nm or more and 668 nm or less and a wavelength range of 782 nm or more and 809 nm or less in its absorption spectrum. When a peak (first peak) with a maximum absorbance among the peaks in the wavelength range of 646 nm or more and 668 nm or less has a maximum absorbance larger than that of a peak (second peak) with a maximum absorbance among the peaks in the wavelength range of 782 nm or more and 809 nm or less. The present inventors have found that such a chlorogallium phthalocyanine pigment exhibits high sensitivity.

It has been also found that an electrophotographic photosensitive member having high sensitivity is produced by adding the above-described particular chlorogallium phthalocyanine crystal to a photosensitive layer (charge generating layer) of an electrophotographic photosensitive member. The present inventors assume that this is because the chlorogallium phthalocyanine crystal having a particular absorption spectrum can efficiently generate carriers due to good balance between transition probability of electrons by exposure and recombination.

The absorbance of the second peak is, for example, 0.65 to 0.99 times the absorbance of the first peak in view of more efficiently generating carriers.

The second peak lies, for example, in the wavelength range of 791 nm or more and 798 nm or less, and the first peak lies, for example, in the wavelength range of 657 nm or more and 665 nm or less.

In an embodiment of the present invention, the absorption spectrum of the chlorogallium phthalocyanine crystal is measured by the following method.

First, 2 parts of a chlorogallium phthalocyanine crystal, 1 part of polyvinyl butyral (trade name: S-LEC BX-1, manufactured by SEKISUI CHEMICAL CO., LTD.), and 52 parts of cyclohexanone are inserted into a sand mill that uses glass beads having a diameter of 1 mm and dispersed for 6 hours. Then, 75 parts of ethyl acetate is added thereto to prepare a chlorogallium phthalocyanine crystal dispersion liquid. The prepared chlorogallium phthalocyanine crystal dispersion liquid is applied onto a Lumirror (model No.: T60, thickness: 100 µm, manufactured by Toray Industries, Inc.) to form a coating film. The resulting coating film is dried to form a chlorogallium phthalocyanine crystal dispersion film having a thickness of 0.20 µm. The absorption spectrum is measured using the dispersion film under the following measurement conditions.

Measurement instrument used: UV-Visible Spectrophotometer JASCO V-570 manufactured by JASCO Corporation
Photometric mode: Abs absorbance measurement
Response: fast
Bandwidth: 2.0 nm
Scanning speed: 200 nm/min
Data acquisition interval: 0.5 nm In an embodiment of the present invention, for example, the chlorogallium phthalocyanine crystal having the particular absorption spectrum is obtained through (1) a synthesis step, (2) an acid pasting step, and (3) a hydrochloric acid treatment step. In particular, the chlorogallium phthalocyanine crystal is desirably obtained through (2) an acid pasting step. Furthermore, a chlorogallium phthalocyanine crystal containing an organic compound therein may be obtained through (4) a wet milling step.

(1) Synthesis Step

The synthesis step is a step of synthesizing a chlorogallium phthalocyanine crystal by reacting a gallium compound and a compound that forms a phthalocyanine ring in a chlorinating aromatic compound. The gallium compound is, for example, gallium trichloride. Furthermore, the compound that forms a phthalocyanine ring is, for example, orthophthalonitrile and the chlorinating aromatic compound is, for example, α-chloronaphthalene.

(2) Acid Pasting Step

The acid pasting step is a step of obtaining a hydroxygallium phthalocyanine crystal by performing an acid pasting treatment in which the chlorogallium phthalocyanine crystal obtained in the synthesis step is mixed with an acid. The acid used in the acid pasting step is preferably sulfuric acid and more preferably concentrated sulfuric acid.

(3) Hydrochloric Acid Treatment Step

The hydrochloric acid treatment step is a step of obtaining a chlorogallium phthalocyanine crystal by mixing the hydroxygallium phthalocyanine crystal obtained in the acid pasting step with an aqueous hydrochloric acid solution.

In the hydrochloric acid treatment step, the concentration of the aqueous hydrochloric acid solution mixed with the hydroxygallium phthalocyanine crystal is preferably 10 mass % or more and more preferably 30 mass % or more in view of reactivity.

In the hydrochloric acid treatment step, the amount of hydrochloric acid mixed with the hydroxygallium phthalocyanine crystal is preferably 10 mol or more and more preferably 100 mol or more based on 1 mol of the hydroxygallium phthalocyanine crystal used.

(4) Wet Milling Step

The wet milling step is a step of mixing the chlorogallium phthalocyanine crystal obtained in the hydrochloric acid treatment step with an organic compound and performing a wet milling treatment. The organic compound is taken into the chlorogallium phthalocyanine crystal in the wet milling step, and thus a chlorogallium phthalocyanine crystal containing the organic compound therein can be obtained. In an embodiment of the present invention, the "wet milling treatment" is a treatment performed using a milling apparatus such as a sand mill, a ball mill, or a paint shaker or a stirring apparatus such as a homogenizer, a mixing impeller, or a magnetic stirrer. The milling treatment time is, for example, 1 to 100 hours.

In an embodiment of the present invention, for example, the chlorogallium phthalocyanine crystal contains an organic compound therein in view of increase in sensitivity. This is because when the chlorogallium phthalocyanine crystal contains an organic compound therein, the movement of carriers (residual carriers) that remain in a photosensitive layer after irradiation with light is facilitated.

Examples of the organic compound used in the wet milling step include amide solvents such as formamide, N,N-dimethylformamide, N,N-dimethylacetamide, N-methylformamide, N-methylacetamide, N-methylpropionamide, and N-methyl-2-pyrrolidone; halogen solvents such as chloroform; ether solvents such as tetrahydrofuran; sulfoxide solvents such as dimethyl sulfoxide; and ketone solvents such as acetone. Among them, at least one selected from the group consisting of acetone, dimethyl sulfoxide, N-methylformamide, and N,N-dimethylformamide is particularly used.

The amount of the organic compound used in the wet milling step is, for example, 5 to 30 times the amount of the chlorogallium phthalocyanine crystal used on a mass basis. The content of the organic compound taken into the crystal after the wet milling step is preferably 0.1 mass % or more and 1.5 mass % or less and more preferably 0.10 mass % or more and 0.80 mass % or less based on the content of the chlorogallium phthalocyanine crystal. The content of the organic compound in the chlorogallium phthalocyanine crystal can be controlled by changing the treatment conditions of the chlorogallium phthalocyanine crystal before the wet milling step and the wet milling conditions. In an embodiment of the present invention, the content of the organic compound can be determined by nuclear magnetic resonance spectroscopy (H-NMR). In Examples described below, the H-NMR measurement was performed using sulfuric acid-D2 ($D_2SO_4$) as a solvent and AVANCEIII 500 manufactured by BRUKER as a measurement instrument.

Next, the case where the above-described chlorogallium phthalocyanine crystal according to an embodiment of the present invention is used as a charge generation material for an electrophotographic photosensitive member will be described.

Electrophotographic Photosensitive Member

An electrophotographic photosensitive member according to an embodiment of the present invention includes a support and a photosensitive layer. The photosensitive layer may be a single-layer type photosensitive layer containing both a charge transport material and a charge generation material or a multilayer type (function-separated) photosensitive layer separately including a charge generating layer containing a charge generation material and a charge transporting layer containing a charge transport material. In view of electrophotographic characteristics, an electrophotographic photosensitive member including a support, a charge generating layer, and a charge transporting layer in this order is particularly used.

Figure 2A:
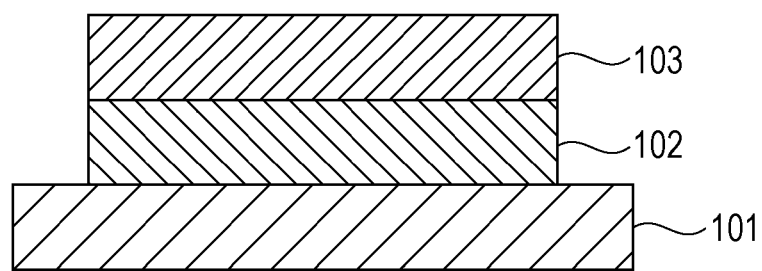
FIGS. 2A and 2B illustrate examples of layer structures of an electrophotographic photosensitive member.
Figure 2B:
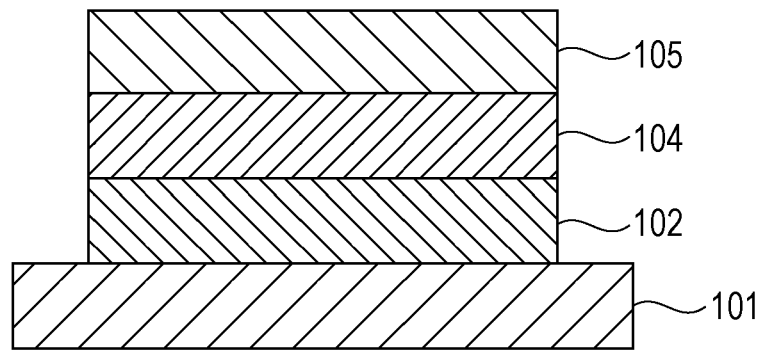

FIGS. 2A and 2B illustrate examples of layer structures of the electrophotographic photosensitive member. FIG. 2A illustrates a single-layer type photosensitive layer in which an undercoat layer 102 is formed on a support 101 and a photosensitive layer 103 is formed on the undercoat layer 102. FIG. 2B illustrates a multilayer type photosensitive layer in which an undercoat layer 102 is formed on a support 101, a charge generating layer 104 is formed on the undercoat layer 102, and a charge transporting layer 105 is formed on the charge generating layer 104.

Support

The support is, for example, a conductive support having electrical conductivity. The support may be, for example, a support made of a metal or an alloy such as aluminum or stainless steel. The support may also be a metal support, a plastic support, or a paper support whose surface is coated with a conductive film. The shape of the support is, for example, a cylindrical shape or a film-like shape.

An undercoat layer or a conductive layer may be disposed between the support and the photosensitive layer.

Conductive Layer

A conductive layer may be disposed between the support and an undercoat layer described below in order to cover unevenness on the surface of the support and suppress interference fringes. The conductive layer can be formed by forming a coating film of a conductive layer-forming coating liquid prepared by dispersing conductive particles, a binder resin, and a solvent and then drying the coating film. The thickness of the conductive layer is preferably 5 to 40 μm and more preferably 10 to 30 μm.

Examples of the conductive particles used in the conductive layer include aluminum particles, titanium oxide particles, tin oxide particles, zinc oxide particles, carbon black, and silver particles. Examples of the binder resin include polyester, polycarbonate, polyvinyl butyral, acrylic resin, silicone resin, epoxy resin, melamine resin, urethane resin, phenolic resin, and alkyd resin. Examples of the solvent for the conductive layer-forming coating liquid include ether solvents, alcohol solvents, ketone solvents, and aromatic hydrocarbon solvents.

Undercoat Layer

An undercoat layer (also referred to as an intermediate layer) having a barrier function and an adhesive function may also be disposed so as to be adjacent to the surface of the photosensitive layer on the support side. The undercoat layer can be formed by forming a coating film of an undercoat layer-forming coating solution prepared by mixing a binder resin and a solvent and drying the coating film. The thickness of the undercoat layer is preferably 0.1 to 10 μm and more preferably 0.3 to 5.0 μm.

Examples of the binder resin used in the undercoat layer include polyvinyl alcohol, polyethylene oxide, ethyl cellulose, methyl cellulose, casein, polyamide, glue, and gelatin.

Photosensitive Layer (1) Single-Layer Type Photosensitive Layer

When the photosensitive layer is a single-layer type photosensitive layer, the photosensitive layer contains the chlorogallium phthalocyanine crystal according to an embodiment of the present invention as a charge generation material. The photosensitive layer can be formed by forming a coating film of a photosensitive layer-forming coating solution prepared by mixing the chlorogallium phthalocyanine crystal according to an embodiment of the present invention, a charge transport material, and a binder resin in a solvent and drying the coating film. The charge transport material and the binder resin are the same as those exemplified in "(2) Multilayer type photosensitive layer" described below.

(2) Multilayer Type Photosensitive Layer

When the photosensitive layer is a multilayer type photosensitive layer, the photosensitive layer includes a charge generating layer and a charge transporting layer.

(2-1) Charge Generating Layer

The charge generating layer contains the chlorogallium phthalocyanine crystal according to an embodiment of the present invention as a charge generation material. The charge generating layer can be formed by forming a coating film of a charge generating layer-forming coating solution prepared by mixing the chlorogallium phthalocyanine crystal and a binder resin in a solvent and then drying the coating film. The thickness of the charge generating layer is preferably 0.05 to 1 μm and more preferably 0.1 to 0.3 μm.

The content of the charge generation material in the charge generating layer is preferably 30 mass % or more and 90 mass % or less and more preferably 50 mass % or more and 80 mass % or less based on the total mass of the charge generating layer.

Materials other than the chlorogallium phthalocyanine crystal according to an embodiment of the present invention may also be used in combination as the charge generation material. In this case, the content of the chlorogallium phthalocyanine crystal according to an embodiment of the present invention is preferably 50 mass % or more based on the total mass of the charge generation material.

Examples of the binder resin used for the charge generating layer include polyester, acrylic resin, phenoxy resin, polycarbonate, polyvinyl butyral, polystyrene, polyvinyl acetate, polysulfone, polyarylate, vinylidene chloride, acrylonitrile copolymers, and polyvinyl benzal. Among them, polyvinyl butyral and polyvinyl benzal are particularly used.

(2-2) Charge Transporting Layer

The charge transporting layer can be formed by forming a coating film of a charge transporting layer-forming coating solution prepared by dissolving a charge transport material and a binder resin in a solvent and drying the coating film. The thickness of the charge transporting layer is preferably 5 to 40 μm and more preferably 10 to 25 μm.

Examples of the charge transport material include triarylamine compounds, hydrazone compounds, stilbene compounds, pyrazoline compounds, oxazole compounds, thiazole compounds, and triallylmethane compounds. Among them, a triarylamine compound is particularly used.

Examples of the binder resin used for the charge transporting layer include polyester, acrylic resin, phenoxy resin, polycarbonate, polystyrene, polyvinyl acetate, polysulfone, polyarylate, vinylidene chloride, and acrylonitrile copolymers. Among them, polycarbonate and polyarylate are particularly used.

The content of the charge transport material in the charge transporting layer is preferably 20 mass % or more and 80 mass % or less and more preferably 30 mass % or more and 60 mass % or less based on the total mass of the charge transporting layer.

Protective Layer

A protective layer may be disposed on a surface of the photosensitive layer, the surface being located opposite the support, in order to protect the photosensitive layer. The protective layer can be formed by forming a coating film of a protective layer-forming coating solution prepared by dissolving a binder resin in a solvent and drying the coating film. Examples of the binder resin used for the protective layer include polyvinyl butyral, polyester, polycarbonate, nylon, polyimide, polyarylate, polyurethane, styrene-butadiene copolymers, styrene-acrylic acid copolymers, and styrene-acrylonitrile copolymers. The thickness of the protective layer is, for example, 0.05 to 20 μm.

To provide charge transportability to the protective layer, the protective layer may be formed by curing a monomer having charge transportability (hole transportability) through a polymerization reaction or a cross-linking reaction. Specifically, the protective layer can be formed by curing a charge transporting compound (hole transporting compound) having a chain-polymerizable functional group through polymerization or cross-linking.

Examples of a method for applying the coating solutions for the above-described layers include dipping, spray coating, spinner coating, bead coating, blade coating, and beam coating.

Surface Layer

The surface layer of the electrophotographic photosensitive member may contain conductive particles, an ultraviolet absorber, and lubricant particles such as fluorine-containing resin particles. The conductive particles are, for example, metal oxide particles such as tin oxide particles.

Process Cartridge and Electrophotographic Apparatus

A process cartridge according to an embodiment of the present invention integrally supports the above-described electrophotographic photosensitive member and at least one selected from a charging device, a developing device, a transfer device, and a cleaning member and is detachably attachable to a main body of an electrophotographic apparatus.

An electrophotographic apparatus according to an embodiment of the present invention includes the above-described electrophotographic photosensitive member, a charging device, an exposure device, a developing device, and a transfer device.

FIG. 1 illustrates an example of a schematic structure of an electrophotographic apparatus that includes a process cartridge including an electrophotographic photosensitive member.

A cylindrical (drum-shaped) electrophotographic photosensitive member 1 is rotated about a shaft 2 at a predetermined peripheral speed (process speed) in a direction indicated by an arrow.

In the rotation, the surface (peripheral surface) of the electrophotographic photosensitive member 1 is charged at a predetermined positive or negative potential by a charging device (primary charging device) 3. The surface of the electrophotographic photosensitive member 1 is then irradiated with exposure light (image exposure light) 4 emitted from an exposure device (image exposure device, not illustrated). Thus, an electrostatic latent image corresponding to intended image information is formed on the surface of the electrophotographic photosensitive member 1. The exposure light 4 is, for example, intensity-modulated light emitted from an exposure device such as a slit exposure device or a laser beam scanning exposure device, in response to the time-series electric digital image signals of the intended image information.

The electrostatic latent image formed on the surface of the electrophotographic photosensitive member 1 is subjected to development (normal or reversal development) with a developing agent (toner) contained in a developing device 5, and thus a toner image is formed on the surface of the electrophotographic photosensitive member 1. The toner image formed on the surface of the electrophotographic photosensitive member 1 is transferred onto a transfer material P by a transfer device 6. Herein, a voltage (transfer bias) having polarity opposite to the polarity of the electric charge of the toner is applied to the transfer device 6 from a bias power supply (not illustrated). The transfer material P is fed to a portion between the electrophotographic photosensitive member 1 and the transfer device 6 from a transfer material feeding device (not illustrated) in synchronism with the rotation of the electrophotographic photosensitive member 1.

The transfer material P onto which the toner image has been transferred is separated from the surface of the electrophotographic photosensitive member 1 and is conveyed to a fixing device 8. After the toner image is fixed, the transfer material P is output from the electrophotographic apparatus as an image-formed article (a print or a copy).

The surface of the electrophotographic photosensitive member 1 after the toner image has been transferred onto the transfer material P is cleaned by removing deposits such as a residual developing agent (residual toner) with a cleaning member 7. Such a residual toner can also be collected by a developing device or the like (cleanerless system).

Furthermore, the surface of the electrophotographic photosensitive member 1 is irradiated with pre-exposure light (not illustrated) from a pre-exposure device (not illustrated) to remove electricity, and then the electrophotographic photosensitive member 1 is repeatedly used for image forming. In the case where the charging device 3 is a contact charging device that uses a charging roller or the like as illustrated in FIG. 1, the pre-exposure device is not necessarily required.

A plurality of components selected from the components such as the electrophotographic photosensitive member 1, the charging device 3, the developing device 5, the transfer device 6, and the cleaning member 7 may be incorporated in a container and integrally supported to provide a process cartridge. The process cartridge may be detachably attachable to the main body of an electrophotographic apparatus. For example, the electrophotographic photosensitive member 1 and at least one selected from the charging device 3, the developing device 5, the transfer device 6, and the cleaning member 7 are integrally supported to provide a process cartridge 9, which is detachably attachable to the main body of an electrophotographic apparatus using a guide unit 10 such as a rail of the main body.

In the case where the electrophotographic apparatus is a copying machine or a printer, the exposure light 4 may be reflected light from a document or transmitted light. Alternatively, the exposure light 4 may be light applied by, for example, scanning with a laser beam according to signals into which a document read by a sensor is converted, driving of an LED array, or driving of a liquid-crystal shutter array.

EXAMPLES

Hereafter, the present invention will be further described in detail based on specific examples, but is not limited thereto. "Part" used below means "part by mass". The thickness of each layer of electrophotographic photosensitive members in Examples and Comparative Examples was determined by using an eddy current thickness meter (Fischerscope, manufactured by Fischer Instruments) or by conversion from the mass per unit area using specific gravity.

Example 1

Synthesis Step

After 36.7 parts of orthophthalonitrile, 25 parts of gallium trichloride, and 300 parts of α-chloronaphthalene were reacted with each other in a nitrogen atmosphere at 200° C. for 5.5 hours, the resulting product was filtered at 130° C. The product was washed by dispersion using N,N-dimethylformamide at 140° C. for 2 hours and then filtered. The filter residue was washed with methanol and dried to obtain 46 parts of chlorogallium phthalocyanine.

Acid Pasting Step

Twenty-four parts of the chlorogallium phthalocyanine obtained in the synthesis step was dissolved in 750 parts of concentrated sulfuric acid at 5° C. The mixture was dropped into 2500 parts of ice water under stirring to perform reprecipitation, and filtration was performed under reduced pressure. Herein, No. 5C (manufactured by ADVANTEC Co., Ltd.) was used as the filter. Subsequently, the filter residue was washed by dispersion using 2% ammonia water for 30 minutes, and then washed by dispersion using ion-exchanged water four times. Finally, freeze drying was performed and thus a hydroxygallium phthalocyanine crystal was obtained at a yield of 97%.
Hydrochloric acid treatment step Ten parts of the hydroxygallium phthalocyanine crystal obtained in the acid pasting step and 200 parts of an aqueous hydrochloric acid solution at 23° C. with a concentration of 35 mass % were mixed with each other and stirred using a magnetic stirrer for 90 minutes. The aqueous hydrochloric acid solution added contained 118 mol of hydrochloric acid based on 1 mol of the hydroxygallium phthalocyanine. After the stirring, the mixture was dropped into 1000 parts of ion-exchanged water cooled with ice water, and stirred using a magnetic stirrer for 30 minutes. Filtration was performed under reduced pressure. Herein, No. 5C (manufactured by ADVANTEC Co., Ltd.) was used as the filter. Subsequently, the filter residue was washed by dispersion using ion-exchanged water at 23° C. four times. Thus, 9 parts of a chlorogallium phthalocyanine crystal was obtained.

Wet Milling Step

At room temperature (23° C.), 0.5 parts of the chlorogallium phthalocyanine crystal obtained in the hydrochloric acid treatment step and 10 parts of N,N-dimethylformamide were subjected to a wet milling treatment for 4 hours using a magnetic stirrer. A chlorogallium phthalocyanine crystal was extracted from the resulting dispersion liquid using tetrahydrofuran and filtered, and the resulting filter residue on the filter was thoroughly washed using tetrahydrofuran. The filter residue was vacuum-dried to obtain 0.47 parts of a chlorogallium phthalocyanine crystal.

It was confirmed from the $^1$H-NMR measurement that the content of the N,N-dimethylformamide was 0.59 mass % based on the chlorogallium phthalocyanine in the chlorogallium phthalocyanine crystal in terms of proton ratio.

Step of Producing Electrophotographic Photosensitive Member

An aluminum cylinder (JIS-A3003, aluminum alloy) having a diameter of 24 mm and a length of 257.5 mm was used as a support (conductive support).

First, 60 parts of barium sulfate particles coated with tin oxide (trade name: Passtran PC1, manufactured by MITSUI MINING & SMELTING Co., Ltd.), 15 parts of titanium oxide particles (trade name: TITANIX JR, manufactured by TAYCA CORPORATION), 43 parts of resole phenolic resin (trade name: Phenolite J-325, manufactured by DIC Corporation, solid content: 70 mass %), 0.015 parts of silicone oil (trade name: SH28PA, manufactured by Dow Corning Toray Co., Ltd.), 3.6 parts of silicone resin particles (trade name: Tospearl 120, manufactured by Toshiba Silicone Co., Ltd.), 50 parts of 2-methoxy-1-propanol, and 50 parts of methanol were inserted into a ball mill and dispersed for 20 hours to prepare a conductive layer-forming coating liquid. The conductive layer-forming coating liquid was applied onto the support by dipping to form a coating film. The coating film was cured by performing heating at 140° C. for 1 hour to form a conductive layer having a thickness of 15 μm.

Subsequently, 10 parts of copolymer nylon (trade name: Amilan CM8000, manufactured by Toray Industries, Inc.) and 30 parts of methoxymethylated 6 nylon (trade name: Toresin EF-30T, manufactured by Teikoku Chemical Industries Co., Ltd.) were dissolved in a mixed solvent of methanol 400 parts/n-butanol 200 parts to prepare an undercoat layer-forming coating solution. The undercoat layer-forming coating solution was applied onto the conductive layer by dipping to form a coating film. The coating film was dried at 80° C. for 6 minutes to form an undercoat layer having a thickness of 0.42 μm.

Subsequently, 2 parts of the chlorogallium phthalocyanine crystal (charge generation material) obtained in the wet milling step, 1 part of polyvinyl butyral (trade name: S-LEC BX-1, manufactured by SEKISUI CHEMICAL CO., LTD.), and 52 parts of cyclohexanone were inserted into a sand mill that uses glass beads having a diameter of 1 mm and dispersed for 6 hours. Then, 75 parts of ethyl acetate was added thereto to prepare a charge generating layer-forming coating solution. The charge generating layer-forming coating solution was applied onto the undercoat layer by dipping to form a coating film. The coating film was dried at 100° C. for 10 minutes to form a charge generating layer having a thickness of 0.20 μm.

Subsequently, 28 parts of a compound represented by formula (C-1) below (charge transport material (hole transport compound)),

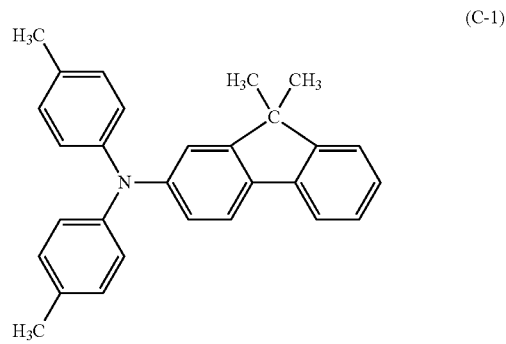 [SMILES: Cc1ccc(N(c2ccc(C)cc2)c2ccc3c(c2)C(C)(C)c2ccccc2-3)cc1]

(C-1)

4 parts of a compound represented by formula (C-2) below (charge transport material (hole transport compound)), and

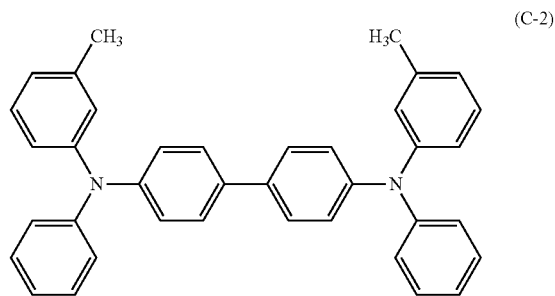 [SMILES: Cc1cccc(N(c2ccccc2)c2ccc(-c3ccc(N(c4ccccc4)c4cccc(C)c4)cc3)cc2)c1]

(C-2)

40 parts of polycarbonate (trade name: Iupilon 2200, manufactured by Mitsubishi Engineering-Plastics Corporation) were dissolved in a mixed solvent of monochlorobenzene 200 parts/dimethoxymethane 50 parts to prepare a charge transporting layer-forming coating solution. The charge transporting layer-forming coating solution was applied onto the charge generating layer by dipping to form a coating film. The coating film was dried at 120° C. for 30 minutes to form a charge transporting layer having a thickness of 18 μm.

Figure 3:
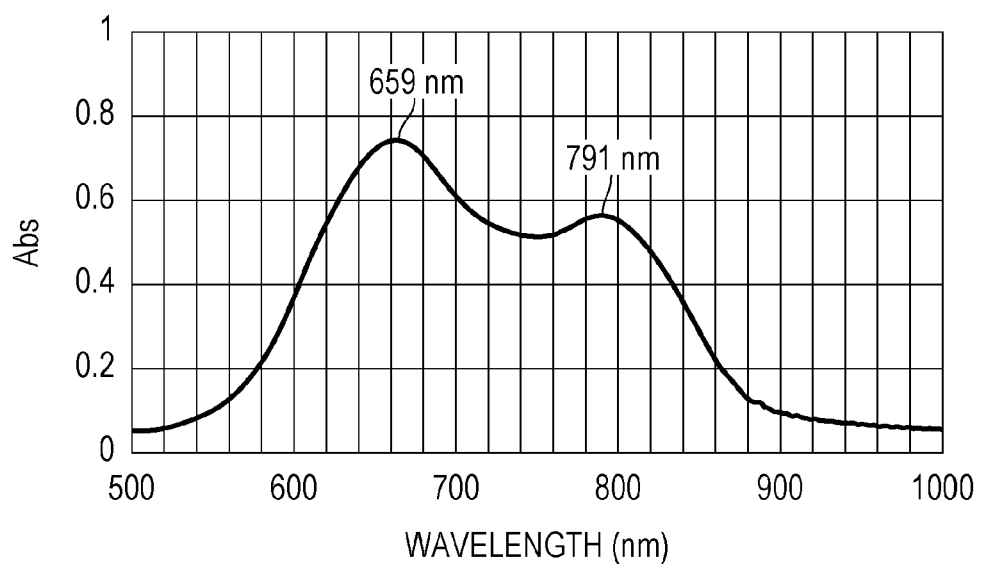
FIG. 3 illustrates an absorption spectrum measured in Example 1.

Thus, a cylindrical (drum-shaped) electrophotographic photosensitive member of Example 1 was produced. Furthermore, as described above, the absorption spectrum was measured using a measurement sample in which the charge generating layer (the above-described dispersion film) was formed on a Lumirror. FIG. 3 illustrates the measurement result.

Example 2

An electrophotographic photosensitive member was produced in the same manner as in Example 1, except that the treatment time of the wet milling step was changed from 4 hours to 24 hours.

Example 3

An electrophotographic photosensitive member was produced in the same manner as in Example 1, except that the treatment time of the wet milling step was changed from 4 hours to 48 hours.

Example 4

An electrophotographic photosensitive member was produced in the same manner as in Example 1, except that the treatment time of the wet milling step was changed from 4 hours to 96 hours.

Example 5

An electrophotographic photosensitive member was produced in the same manner as in Example 2, except that the organic compound mixed in the wet milling step was changed from 10 parts of N,N-dimethylformamide to 10 parts of dimethyl sulfoxide.

It was confirmed from the $^1$H-NMR measurement that the content of the dimethyl sulfoxide was 0.37 mass % based on the chlorogallium phthalocyanine in the chlorogallium phthalocyanine crystal obtained in the wet milling step in terms of proton ratio.

Example 6

An electrophotographic photosensitive member was produced in the same manner as in Example 2, except that the organic compound mixed in the wet milling step was changed from 10 parts of N,N-dimethylformamide to 10 parts of acetone.

It was confirmed from the $^1$H-NMR measurement that the content of the acetone was 0.13 mass % based on the chlorogallium phthalocyanine in the chlorogallium phthalocyanine crystal obtained in the wet milling step in terms of proton ratio.

Example 7

An electrophotographic photosensitive member was produced in the same manner as in Example 2, except that the organic compound mixed in the wet milling step was changed from 10 parts of N,N-dimethylformamide to 10 parts of N-methylformamide.

It was confirmed from the $^1$H-NMR measurement that the content of the N-methylformamide was 0.41 mass % based on the chlorogallium phthalocyanine in the chlorogallium phthalocyanine crystal obtained in the wet milling step in terms of proton ratio.

Example 8

An electrophotographic photosensitive member was produced in the same manner as in Example 2, except that the organic compound mixed in the wet milling step was changed from 10 parts of N,N-dimethylformamide to 10 parts of tetrahydrofuran.

It was confirmed from the $^1$H-NMR measurement that the content of the tetrahydrofuran was 0.37 mass % based on the chlorogallium phthalocyanine in the chlorogallium phthalocyanine crystal obtained in the wet milling step in terms of proton ratio.

Example 9

An electrophotographic photosensitive member was produced in the same manner as in Example 1, except that 15 parts of glass beads having a diameter of 1 mm were added as media in the wet milling step, the apparatus was changed to a paint shaker, and the treatment time was changed to 1 hour.

Example 10

Figure 4:
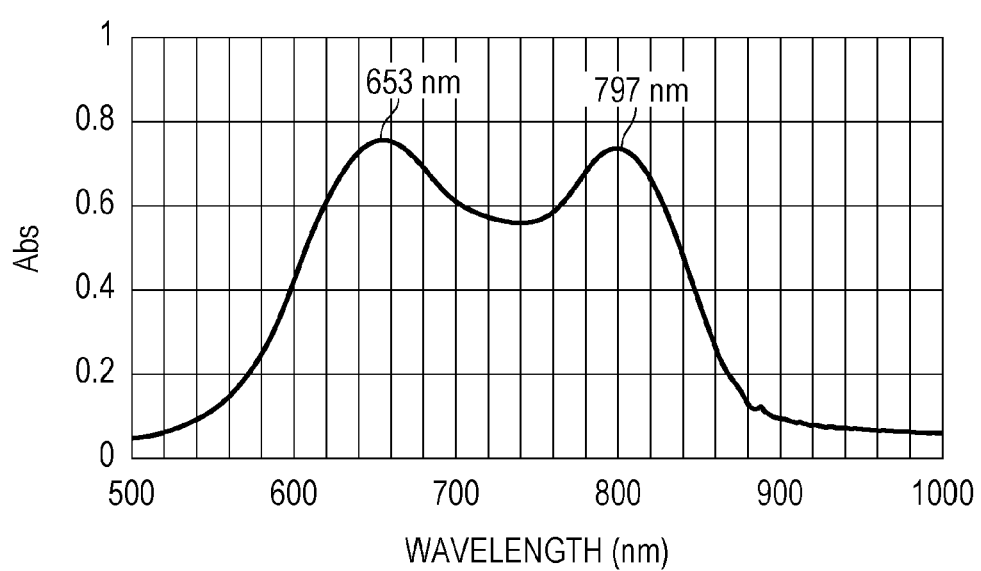
FIG. 4 illustrates an absorption spectrum measured in Example 10.

An electrophotographic photosensitive member was produced in the same manner as in Example 9, except that the apparatus in the wet milling step was changed to a ball mill (120 rpm) and the treatment time was changed to 2 hours. FIG. 4 illustrates the measured absorption spectrum.

Example 11

An electrophotographic photosensitive member was produced in the same manner as in Example 10, except that the treatment time of the wet milling step was changed to 4 hours.

Example 12

An electrophotographic photosensitive member was produced in the same manner as in Example 10, except that the treatment time of the wet milling step was changed to 8 hours.

Example 13

An electrophotographic photosensitive member was produced in the same manner as in Example 10, except that the treatment time of the wet milling step was changed to 16 hours.

Example 14

An electrophotographic photosensitive member was produced in the same manner as in Example 10, except that the treatment time of the wet milling step was changed to 24 hours.

Example 15

An electrophotographic photosensitive member was produced in the same manner as in Example 10, except that the treatment time of the wet milling step was changed to 48 hours.

Example 16

An electrophotographic photosensitive member was produced in the same manner as in Example 10, except that the treatment time of the wet milling step was changed to 96 hours.

Example 17

An electrophotographic photosensitive member was produced in the same manner as in Example 1, except that the apparatus in the wet milling step was changed to an ultrasonic disperser and the treatment time was changed to 1 hour.

Example 18

An electrophotographic photosensitive member was produced in the same manner as in Example 10, except that the organic compound mixed in the wet milling step was changed from 10 parts of N,N-dimethylformamide to 10 parts of dimethyl sulfoxide.

Example 19

An electrophotographic photosensitive member was produced in the same manner as in Example 2, except that 200 parts of the aqueous hydrochloric acid solution mixed in the hydrochloric acid treatment step was changed to 100 parts of the aqueous hydrochloric acid solution.

Comparative Example 1

Figure 5:
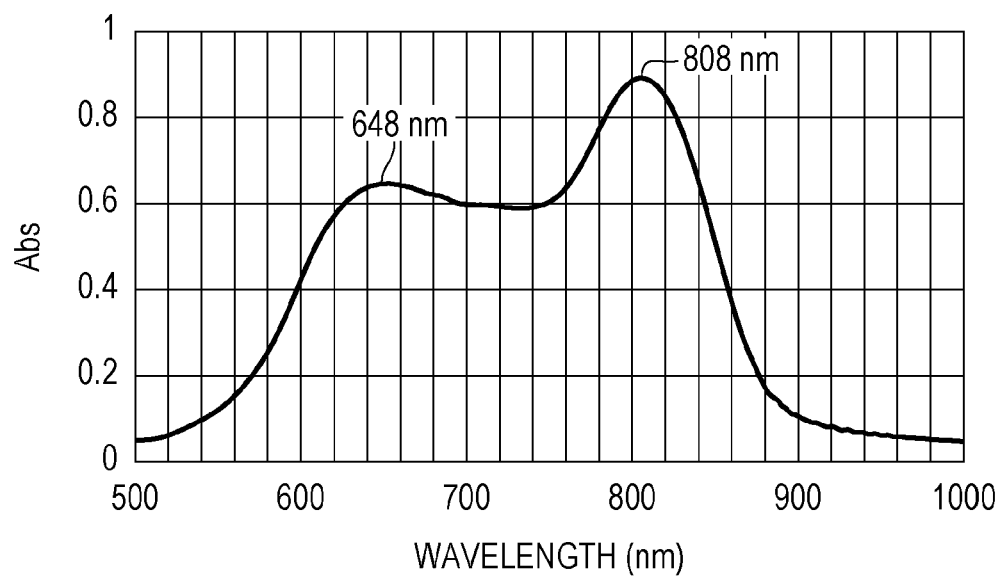
FIG. 5 illustrates an absorption spectrum measured in Comparative Example 1.

An electrophotographic photosensitive member was produced in the same manner as in Example 18, except that the organic compound mixed in the wet milling step was changed from 10 parts of N,N-dimethylformamide to 10 parts of tetrahydrofuran. FIG. 5 illustrates the measured absorption spectrum.

Comparative Example 2

An electrophotographic photosensitive member was produced in the same manner as in Example 9, except that the treatment time of the wet milling step was changed to 48 hours. The absorption spectrum in Comparative Example 2 had no maximum peak in the range of 646 nm or more and 668 nm or less (range A), but had a maximum peak at 643 nm.

Comparative Example 3

An electrophotographic photosensitive member was produced in the same manner as in Example 1, except that the chlorogallium phthalocyanine crystal (charge generation material) in the step of producing an electrophotographic photosensitive member was changed to a chlorogallium phthalocyanine crystal obtained by the method described in Synthesis Example 2 of Japanese Patent Laid-Open No. 2005-249964. The absorption spectrum in Comparative Example 3 had no maximum peak in the range of 646 nm or more and 668 nm or less (range A), but had a maximum peak at 672 nm.

Comparative Example 4

An electrophotographic photosensitive member was produced in the same manner as in Comparative Example 3, except that the chlorogallium phthalocyanine crystal (charge generation material) in the step of producing an electrophotographic photosensitive member was changed to a chlorogallium phthalocyanine crystal obtained by the method described in Comparative Example 1 of Japanese Patent Laid-Open No. 2009-62475. The absorption spectrum in Comparative Example 4 had no maximum peak in the range of 782 nm or more and 809 nm or less (range B), but had a maximum peak at 780 nm.

TABLE 1

| | Production conditions of crystal | | | | |
|---|---|---|---|---|---|
| | Hydrochloric acid treatment step Amount of aqueous | Wet milling step | | | |
| Example No. | hydrochloric acid solution used (part) | Apparatus for treatment | Media | Treatment time | Organic compound used |
| Example 1 | 200 | Magnetic stirrer | — | 4 h | N,N-dimethylformamide |
| Example 2 | 200 | Magnetic stirrer | — | 24 h | N,N-dimethylformamide |
| Example 3 | 200 | Magnetic stirrer | — | 48 h | N,N-dimethylformamide |
| Example 4 | 200 | Magnetic stirrer | — | 96 h | N,N-dimethylformamide |
| Example 5 | 200 | Magnetic stirrer | — | 24 h | dimethyl sulfoxide |
| Example 6 | 200 | Magnetic stirrer | — | 24 h | acetone |
| Example 7 | 200 | Magnetic stirrer | — | 24 h | N-methylformamide |
| Example 8 | 200 | Magnetic stirrer | — | 24 h | tetrahydrofuran |
| Example 9 | 200 | Paint shaker | Glass beads with diameter of 1 mm | 1 h | N,N-dimethylformamide |
| Example 10 | 200 | Ball mill | Glass beads with diameter of 1 mm | 2 h | N,N dimethylformamide |
| Example 11 | 200 | Ball mill | Glass beads with diameter of 1 mm | 4 h | N,N dimethylformamide |
| Example 12 | 200 | Ball mill | Glass beads with diameter of 1 mm | 8 h | N,N dimethylformamide |
| Example 13 | 200 | Ball mill | Glass beads with diameter of 1 mm | 16 h | N,N dimethylformamide |
| Example 14 | 200 | Ball mill | Glass beads with diameter of 1 mm | 24 h | N,N dimethylformamide |
| Example 15 | 200 | Ball mill | Glass beads with diameter of 1 mm | 48 h | N,N dimethylformamide |

TABLE 1-continued

| | Production conditions of crystal | | | | |
|---|---|---|---|---|---|
| | Hydrochloric acid treatment step Amount of aqueous | Wet milling step | | | |
| Example No. | hydrochloric acid solution used (part) | Apparatus for treatment | Media | Treatment time | Organic compound used |
| Example 16 | 200 | Ball mill | Glass beads with diameter of 1 mm | 96 h | N,N dimethylformamide |
| Example 17 | 200 | Ultrasonic disperser | — | 1 h | N,N dimethylformamide |
| Example 18 | 200 | Ball mill | Glass beads with diameter of 1 mm | 500 h | dimethyl sulfoxide |
| Example 19 | 100 | Magnetic stirrer | — | 24 h | N,N-dimethylformamide |
| Comparative Example 1 | 200 | Ball mill | Glass beads with diameter of 1 mm | 500 h | tetrahydrofuran |
| Comparative Example 2 | 200 | Paint shaker | Glass beads with diameter of 1 mm | 48 h | N,N-dimethylformamide |
| Comparative Example 3 | 200 | Magnetic stirrer | — | 4 h | chlorobenzene |
| Comparative Example 4 | 200 | Magnetic stirrer | — | 4 h | dimethyl sulfoxide |

Evaluation of Sensitivity of Electrophotographic Photosensitive Member

The sensitivity was evaluated using the produced electrophotographic photosensitive members.

Figure 6:
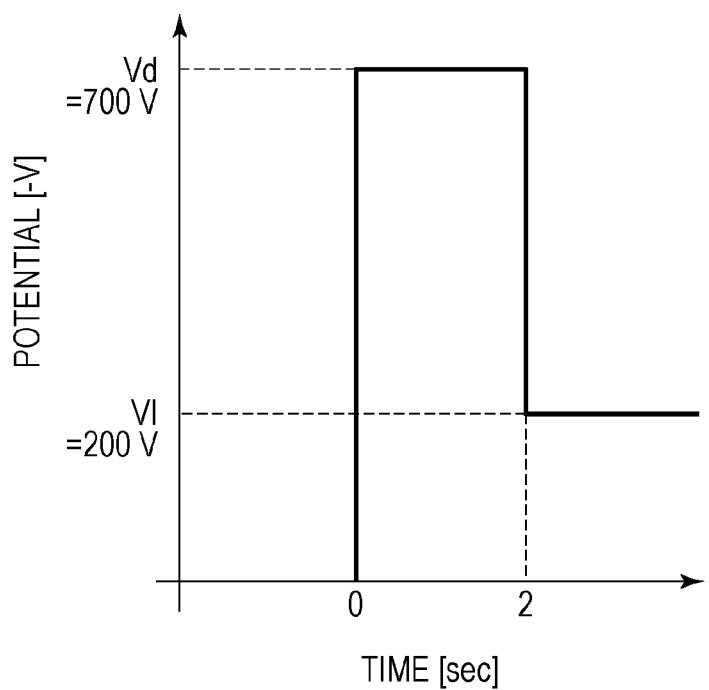
FIG. 6 is a diagram describing the evaluation of sensitivity of an electrophotographic photosensitive member.

The sensitivity was measured by measuring the electrophotographic characteristics of each of the produced electrophotographic photosensitive members with a direct voltage application-type electrophotographic photosensitive member measuring apparatus that uses curved NESA glass. Specifically, first, in order to remove the hysteresis of the electrophotographic photosensitive member (hysteresis of potential), the entire surface of the electrophotographic photosensitive member was irradiated with light having a particular light amount (1 μJ/cm$^2$). Ten milliseconds after the irradiation, the surface of the electrophotographic photosensitive member was charged in a dark place so that the surface of the electrophotographic photosensitive member had a particular potential (Vd: −700 V). In the dark place, the surface of the electrophotographic photosensitive member was exposed two seconds after the charging so that the potential (V1) after the exposure was −200 V, and the exposure amount (μJ/cm$^2$) was evaluated as the sensitivity. The smaller the exposure amount, the higher the sensitivity of the electrophotographic photosensitive member. When the exposure amount was 0.300 μJ/cm$^2$ or less, the effects of the present invention were judged to be achieved. FIG. 6 illustrates a change in the potential of the surface of the electrophotographic photosensitive member in this evaluation.

TABLE 2

Result of absorption spectrum and Evaluation result

| | Absorption spectrum | | | Evaluation result |
|---|---|---|---|---|
| | Wavelength of peak with maximum absorbance | | | |
| Example No. | First peak Wavelength range A: 646 to 668 nm (nm) | Second peak Wavelength range B: 782 to 809 nm (nm) | Absorbance ratio (first peak/second peak) | Exposure amount (μJ/cm$^2$) |
| Example 1 | 659 | 791 | 0.787 | 0.160 |
| Example 2 | 660 | 792 | 0.677 | 0.169 |
| Example 3 | 665 | 782 | 0.651 | 0.178 |
| Example 4 | 666 | 782 | 0.673 | 0.183 |
| Example 5 | 659 | 792 | 0.679 | 0.164 |
| Example 6 | 656 | 798 | 0.720 | 0.175 |
| Example 7 | 660 | 782 | 0.686 | 0.182 |
| Example 8 | 653 | 804 | 0.912 | 0.211 |
| Example 9 | 659 | 791 | 0.764 | 0.171 |
| Example 10 | 653 | 797 | 0.974 | 0.172 |
| Example 11 | 658 | 797 | 0.875 | 0.165 |
| Example 12 | 659 | 792 | 0.772 | 0.167 |
| Example 13 | 659 | 792 | 0.741 | 0.172 |
| Example 14 | 663 | 789 | 0.728 | 0.179 |
| Example 15 | 663 | 785 | 0.685 | 0.185 |
| Example 16 | 663 | 784 | 0.675 | 0.187 |
| Example 17 | 649 | 806 | 0.918 | 0.201 |
| Example 18 | 663 | 783 | 0.619 | 0.232 |
| Example 19 | 661 | 793 | 0.667 | 0.172 |
| Comparative Example 1 | 648 | 808 | 1.355 | 0.444 |
| Comparative Example 2 | 643 | 789 | 0.740 | 0.311 |
| Comparative Example 3 | 672 | 788 | — | 0.364 |
| Comparative Example 4 | 655 | 780 | 0.829 | 0.331 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220751, filed Oct. 29, 2014, which is hereby incorporated by reference herein in its entirety.

What is claimed is:

1. An electrophotographic photosensitive member comprising:
a support; and
a photosensitive layer in this order,
wherein the photosensitive layer comprises a chlorogallium phthalocyanine crystal,
the chlorogallium phthalocyanine crystal has one or more peaks in each of a wavelength range of 646 nm or more and 668 nm or less and a wavelength range of 782 nm or more and 809 nm or less in an absorption spectrum, and
when a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

2. An electrophotographic photosensitive member comprising:
a support;
a charge generating layer; and
a charge transporting layer in this order,
wherein the charge generating layer comprises a chlorogallium phthalocyanine crystal,
the chlorogallium phthalocyanine crystal has one or more peaks in each of a wavelength range of 646 nm or more and 668 nm or less and a wavelength range of 782 nm or more and 809 nm or less in an absorption spectrum, and
when a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

3. The electrophotographic photosensitive member according to claim 1, wherein the absorbance of the second peak is 0.65 to 0.99 times the absorbance of the first peak.

4. The electrophotographic photosensitive member according to claim 1, wherein the second peak lies in a wavelength range of 791 nm or more and 798 nm or less.

5. The electrophotographic photosensitive member according to claim 1, wherein the first peak lies in a wavelength range of 657 nm or more and 665 nm or less.

6. The electrophotographic photosensitive member according to claim 1, wherein the chlorogallium phthalocyanine crystal comprises at least one organic compound selected from the group consisting of acetone, dimethyl sulfoxide, N-methylformamide, and N,N-dimethylformamide therein.

7. A process cartridge detachably attachable to a main body of an electrophotographic apparatus, the process cartridge integrally supporting an electrophotographic photosensitive member and at least one selected from the group consisting of a charging device, a developing device, a transfer device, and a cleaning member,
wherein the electrophotographic photosensitive member comprises a support and a photosensitive layer in this order,
the photosensitive layer comprises a chlorogallium phthalocyanine crystal,
the chlorogallium phthalocyanine crystal has one or more peaks in each of a wavelength range of 646 nm or more and 668 nm or less and a wavelength range of 782 nm or more and 809 nm or less in an absorption spectrum, and
when a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

8. An electrophotographic apparatus comprising:
an electrophotographic photosensitive member;
a charging device;
an exposure device;
a developing device; and
a transfer device,
wherein the electrophotographic photosensitive member comprises a support and a photosensitive layer in this order,
the photosensitive layer comprises a chlorogallium phthalocyanine crystal,
the chlorogallium phthalocyanine crystal has one or more peaks in each of a wavelength range of 646 nm or more and 668 nm or less and a wavelength range of 782 nm or more and 809 nm or less in an absorption spectrum, and
when a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

9. A chlorogallium phthalocyanine crystal comprising one or more peaks in each of a wavelength range of 646 nm or more and 668 nm or less and a wavelength range of 782 nm or more and 809 nm or less in an absorption spectrum, and
wherein when a peak with a maximum absorbance among the peaks in the wavelength range of 646 nm or more and 668 nm or less is assumed to be a first peak and a peak with a maximum absorbance among the peaks in the wavelength range of 782 nm or more and 809 nm or less is assumed to be a second peak, an absorbance of the first peak is larger than an absorbance of the second peak.

* * * * *